United States Patent [19]

Ely

[11] Patent Number: 4,786,797

[45] Date of Patent: Nov. 22, 1988

[54] ELECTRO-OPTICAL DATA HANDLING SYSTEM WITH NOISE IMMUNITY

[75] Inventor: Richard I. Ely, Flemington, N.J.

[73] Assignee: Unisys Corporation, Blue Bell, Pa.

[21] Appl. No.: 138,254

[22] Filed: Dec. 28, 1987

[51] Int. Cl.$^4$ .................................................. G02F 1/00
[52] U.S. Cl. ............................... 250/214 R; 455/608;
455/619
[58] Field of Search ........... 250/214 A, 214 C, 214 R;
307/311; 330/59, 250, 308; 455/608, 610, 611,
617–619

[56] References Cited

U.S. PATENT DOCUMENTS

| 4,620,321 | 10/1986 | Chown | 250/214 A |
| 4,654,892 | 3/1987 | Ely | 250/214 A |
| 4,679,251 | 7/1987 | Chown | 250/214 A |
| 4,688,267 | 8/1987 | Chown et al. | 250/214 A |

Primary Examiner—David C. Nelms
Assistant Examiner—Stephone B. Allen
Attorney, Agent, or Firm—Albert B. Cooper; Laurence J. Marhoefer

[57] ABSTRACT

A source of light modulated by input data provides the modulated light to a phototransistor. A capacitor couples the emitter of the phototransistor to ground. A discharging transistor switch is coupled across the capacitor and a voltage comparator is coupled to the phototransistor emitter for providing a signal when the voltage across the capacitor exceeds a predetermined threshold. A microprocessor coupled to the comparator actuates the discharging switch in accordance with the comparator output.

9 Claims, 3 Drawing Sheets

ELECTRO-OPTICAL DATA HANDLING SYSTEM WITH NOISE IMMUNITY

BACKGROUND OF THE INVENTION

1. Field of the Invention

The invention relates to electro-optical data handling systems that convert light modulation into electrical signals.

2. Description of the Prior Art

Electro-optical data handling systems are known in the art that may be utilized, for example, to transmit data from a computer to a printer. In such apparatus, data signals modulate light that is received by a phototransistor. The phototransistor, in turn, provides an output electrical signal in accordance with the light modulation.

Some of these prior art circuits couple light from a data source through fiber optics to a phototransistor having a resistive load. Although such circuits generally operate satisfactorily, they are, however, sensitive to noise pick up by the electronic circuit components and conductors. Since a primary purpose of a fiber optical system is noise immunity, such prior art noise sensitive transducers tend to obviate this purpose. Additionally, such resistively loaded transducers tend to be limited in speed of response and thus limit the bandwidth of the circuit.

An example of a prior art electro-optical system utilizing light modulation is described in U.S. Pat. No. 4,654,892 issued Mar. 31, 1987. Although the system of said U.S. Pat. No. 4,654,892 operates generally satisfactorily, the device tends to be sensitive to electrical noise pickup as described above. Additionally, the device provides an analog output that is not compatible with present day digital circuitry such as microprocessors which require, for example, TTL signals. A level comparator and wave shaping circuitry are required at the output of the device of said U.S. Pat. No. 4,654,892 to provide an output compatible with digital circuits.

SUMMARY OF THE INVENTION

The above described disadvantages of the prior art are obviated by electro-optical apparatus that includes a source of light that is modulated by input data. A light responsive transistor coupled to receive the modulated light has a capacitor coupled in series therewith so that the transistor charges the capacitor in response to the modulated light impinging thereon. A sensing means is responsive to the voltage developed across the capacitor and discharging means are coupled to discharge the capacitor, thereby providing an electrical output signal in accordance with the data.

The present invention, therefore, utilizes a capacitive phototransistor circuit that is minimally sensitive to noise and operates well over a wide dynamic range of light input power.

DESCRIPTION OF THE PREFERRED EMBODIMENTS

Figure 1:
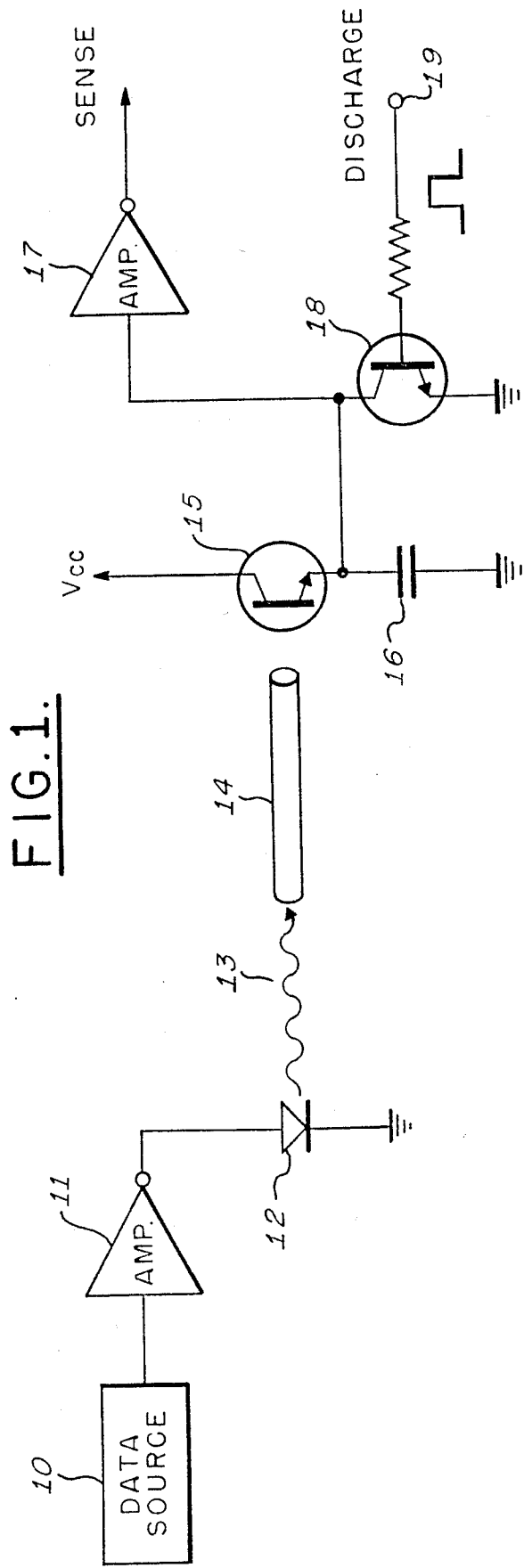
FIG. 1 is a schematic circuit diagram of an electro-optical system embodying the concepts of the invention.

Referring to FIG. 1 an electro-optical circuit for transmitting data is illustrated. The circuit may for example transmit data from a computer to a printer in, for example, an RS232 format. The data may be transmitted synchronously or asynchronously. The circuit of FIG. 1 may also be utilized in a keyboard for transmitting whether or not a key has been depressed. A data source 10 provides the input data through a amplifier 11 to modulate the light output of a light source such as a light emitting diode (LED) 12. The LED 12 may have any additional circuitry connected therewith required to provide the modulated light output. The output of the LED 12 is a light signal 13 modulated by the input data signals from the data source 10. In the case of binary data such as RS232 or keyboard data, the data source 10 turns the light signal on and off in accordance with the binary state of the input data. In typical embodiments such as an asynchronous RS232 data system or a keyboard, binary zeros or the OFF state are transmitted significantly more often than binary one or the ON state. For reasons to be discussed, it is desirable that light output from the light source 12 represent binary zero and no light output represent binary one.

The modulated light output from the LED 12 is coupled by a fiber optic system 14 to the input of phototransistor 15, such as an MFOD72. It is appreciated that the modulated light may be transmitted from the LED 12 to the phototransistor 15 through any suitable light path or optical system.

The emitter of the phototransistor 15 is connected to ground via a capacitor 16. The capacitor 16 preferably has a capacitance which is small compared to the effective internal capacitance of the phototransistor 15. Typically the capacitor 16 may have a capacitor of approximately 120 pf. The effective internal capacitance of phototransistors, such as the one utilized in the present invention, in approximately 10,000 pf. The emitter of the phototransistor 15 is also coupled to the input of an operational amplifier 17 which provides a circuit sense output to a voltage detection device or utilization device. The operational amplifier 17 has a high input impedance so that it does not load down the phototransistor 15. The operational amplifier 17 functions as a high impedance buffer between the phototransistor 15 and a device to which the circuit of FIG. 1 is connected.

A switch 18 is connected across the capacitor 16 to discharge the capacitor 16 as well as the internal capacitance of the phototransistor 15 in response to a discharge or reset pulse applied at a terminal 19. Specifically, the switch 18 is implemented by an NPN transistor amplifier such as a 2N2222 having the collector thereof coupled to the emitter of the phototransistor 15. The base of the switching transistor 18 is connected through a resistor to the source of discharge or reset pulses connected to the terminal 19.

In operation of the circuit of FIG. 1, data is transmitted from the data source 10 through the amplifier 11 to the LED 12. In response to the signal from the data source 10, the LED 12 generates pulses of light which are transmitted along the fiber optic system 14 to the phototransistor 15. In response to the light pulses, the phototransistor 15 generates photo current which charges the capacitor 16.

When the phototransistor 15 receives the light pulses, current flows therethrough and charges the capacitor 16 which preferably has a small capacitance compared to the effective internal capacitance of the phototransistor 15. Accordingly, the external capacitor 16 has little affect on the rise time or speed of response of the phototransistor 15. The capacitance of the capacitor 16, however, is sufficient to provide significant immunity to high frequency noise contamination. The current flowing through the phototransistor 15 resulting from the light impinging thereon, continues to charge the capacitor 16 and the voltage thereacross increase. The output of the amplifier 17 follows the voltage building up across the capacitor 16. The amplifier 17 is a high input impedence buffer that does not draw charge from the capacitor 16. When the transistor amplifier 18 is turned on by a discharge pulse applied to the terminal 19, the capacitor 16 and the phototransistor 16 are discharged through the transistor 18. When the transistor 18 turns off, the phototransistor 15 again commences charging up the capacitor 16 in accordance with the light impinging thereon. The sense output of the amplifier 17 and the discharging transistor 18 may be utilized and operated in a manner to detect the data provided by the data source 10. For example the output of the amplifier 17 may be sensed and the discharge pulse applied to the terminal 19 thereafter. The discharge pulses may be applied to the terminal 19 as a function of the sense output from the amplifier 17 or in accordance with predetermined time intervals. In a manner to be later described, the capacitor 16 is discharged when the sense output of the amplifier 17 attains a predetermined voltage threshold.

Figure 2:
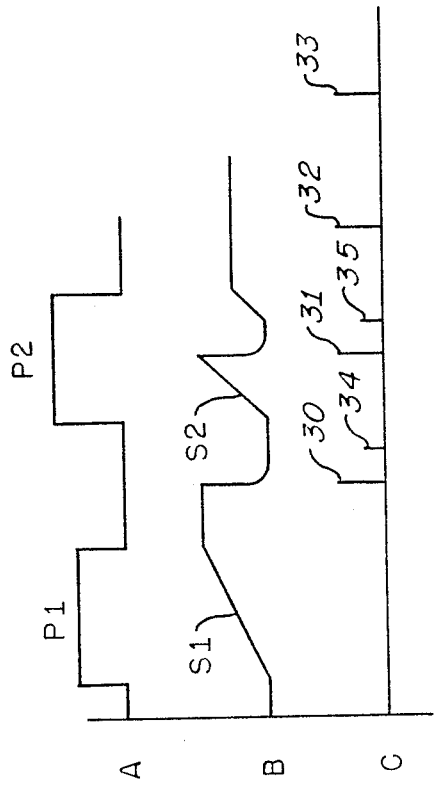
FIG. 2 is a waveform diagram illustrating aspects of the operation of the circuit of FIG. 1.

Referring to FIG. 2, waveforms depicting the operation of the circuit of FIG. 1 are illustrated. Waveform A represents the input to the phototransistor 15, waveform B represents the output of the emitter of the phototransistor 15 and waveform C represents timing of the switch 18 as well as data sampling times. Waveform A illustrates typical input light pulses, P1 and P2 having the same time duration but different amplitudes. P1 is a low amplitude pulse and P2 is a high amplitude pulse. The pulses P1 and P2 produce respective output sense pulses S1 and S2 of different rise Times. In response to the low amplitude pulse P1 the output signal at the emitter is a slowly rising ramp. In response to the high amplitude pulse P2, the emitter output signal S2 is a sharply rising ramp. Accordingly, the pulse S2 will attain a predetermined threshold voltage sooner than the pulse S1. Since the rate of increase of voltage across the capacitor 16 is directly proportional to the power of the light signal received by the phototransistor 15, the time take to attain the predetermined threshold voltage is a relative measure of the strength of the incoming light signal, and hence is a measure of the states of the input data. The circuit of FIG. 1 may, therefore, be utilized to measure the light levels by measuring the time required to charge the capacitor 16. Typical sample times of the sense output are illustrated on waveform C as 30, 31, 32 and 33. The switch 18 may be closed at the sample times 30–33 and may be opened, for example, at times 34 and 35.

Figure 3:
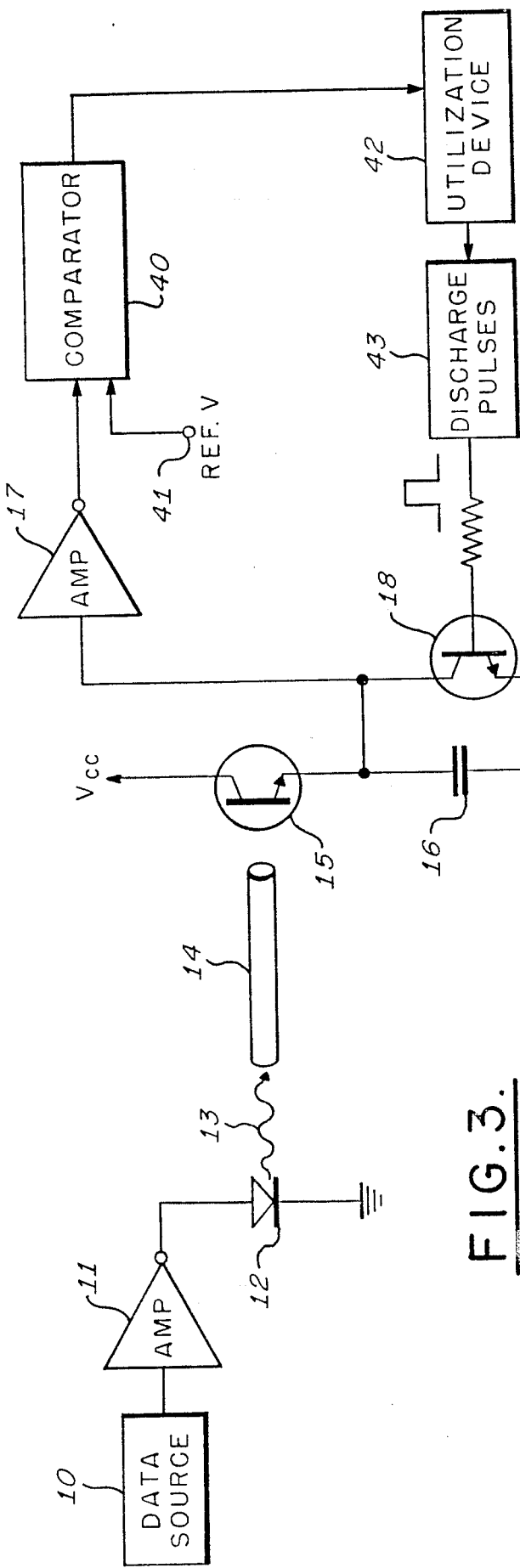
FIG. 3 is a schematic circuit diagram illustrating a preferred mode of utilizing the circuit of FIG. 1.

Referring to FIG. 3, in which like reference numerals indicate like components with respect to FIG. 1, a preferred mode of utilizing the circuit of FIG. 1 is illustrated. The output of the amplifier 17 is applied as an input to a comparator 40 which also receives, at a second input thereof, a reference voltage applied at a terminal 41. The threshold of the comparator 40 is established in accordance with the reference voltage whereby the comparator 40 toggles when the voltage output of the amplifier 17 exceeds the reference voltage. The output of the comparator 40 is applied to a utilization device 42 such as a microprocessor. The utilization device 42 controls a circuit 43 for generating and applying the discharge pulses to the base electrode of the transistor switch 18. The duration of the discharge pulse is selected such that the transistor switch 18 is closed long enough to discharge the capacitor 16 and the phototransistor 15.

As discussed above with respect to FIG. 2, the pulse S2 resulting from the high amplitude pulse P2 will attain the reference voltage of the comparator 40 sooner than the pulse S1 resulting from the low amplitude pulse P1. Since the rate of increase of voltage across the capacitor 16 is directly proportional to the power of the light signal received by the phototransistor 15, the time utilized to attain the threshold voltage of the comparator 40 is a measure of the strength of the incoming light signal and of the data provided by the data source 10. The utilization device 42, when implemented by a microprocessor, performs a decision making process based on the output of the comparator 40 to determine when to discharge the capacitor 16. The utilization device 42, may for example, implement the timing illustrated in FIG. 2 to determine the states of the data signal. When the comparator 40 signals a voltage crossing the capacitor 16 may be discharged and then permitted to recharge, the microprocessor examining the output of the comparator 40 at a later time to determine input bit rates thereby synchronizing the operation with respect to the data to determine the data states. In response to the absence of light the comparator 40 remains in a quiescent "off" state. In the presence of light, the comparator 40 will toggle regularly at a frequency determined by the light level impinging on the phototransistor 15. The utilization device 42 can thereby detect the start of an asynchronous data transmission from the data source 10. The data rate may then be determined and the data detected. The utilization device 42 after detecting the change of status of the comparator 40, samples the output of the comparator 40 at intervals related to the bit time to detect the data.

Figure 4:
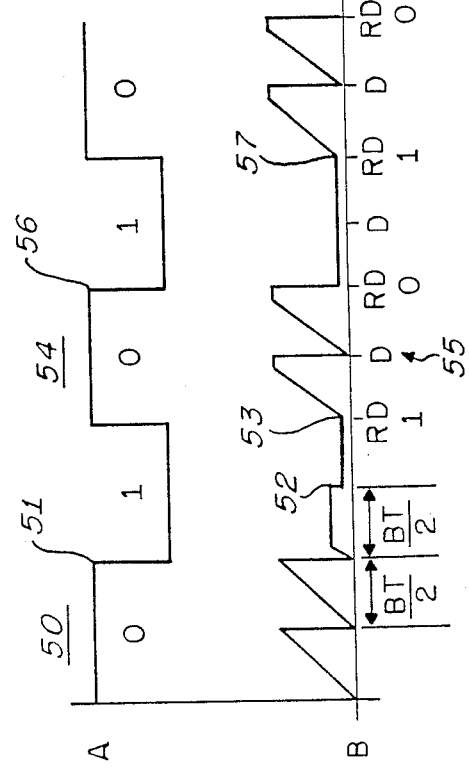
FIG. 4 is a waveform diagram illustrating the operation of the circuit of FIG. 3.

FIG. 4 illustrates waveforms depicting a preferred operating mode of the apparatus of FIG. 3. In this mode the apparatus detects asynchronous data transmission such as RS232 or keyboard data. Waveform A illustrates a typical input to the phototransistor 15 and waveform B illustrates the output of the buffer amplifier 17. The operation depicted in FIG. 4 is predicted on a minimum light signal strength capable of producing two crossings of the threshold of the comparator 40 in one data bit time. The format of FIG. 4 is also predicted on the presence of light representing binary zero and the absence of light representing binary one. This format is utilized to obviate anomalies that may be caused by the phototransistor dark current. If there is an absence of light for a period of time, the dark current would charge the capacitor 16 eventually triggering the comparator 40 which would be incorrectly interpreted as a data bit. By utilizing the presence of light to represent the "off" state, the apparatus continuously cycles until a bit is received.

During a quiescent interval 50 of FIG. 4, binary zero is received as illustrated by waveform A and is represented by the presence of a light signal. As illustrated by waveform B and with continued reference to FIG. 3, the capacitor 16 charges at a rate proportional to the light signal strength. When the output of the buffer amplifier 17 exceeds the threshold of the comparator 40, the comparator 40 toggles signaling the utilization device 42. The utilization device 42 in response thereto activates the circuit 43 to discharge the capacitor 16 and the phototransistor 15. The threshold of the comparator 40 and the gains of the system are chosen such that two threshold crossings occur in each bit time of the data system in which the invention is utilized. Waveform B illustrates the ramp signals generated as described.

At point 51 a one bit is received which is represented by the absence of light. The utilization device 42 waits ½ bit time after the large discharge and then again discharges the capacitor 16 at point 52. At point 52, since no signal is present, the utilization device 42 is then aware that the first bit has occurred. Accordingly, utilization device 42 waits another ½ bit time (point 53) and reads the output of the comparator and thereafter discharges the capacitor 16. This operation is denoted on waveform B as RD. It is appreciated that since no signal is detected at the point 53, the first binary one has been detected.

During the next bit time denoted as 54, a binary zero is transmitted represented by the presence of light. When the voltage output of the amplifier 17 attains the threshold, the capacitor 16 is discharged at a point 55 but the signal is not read. The action of discharging without reading is denoted on waveform B as D. During the second half of bit time 54, the capacitor 16 again charges to the threshold and is read and discharged at a point 56. Since signal is present at the point 56 prior to discharge, the binary zero has been detected. During the next occurring bit time, binary one is transmitted resulting in no signal read at a point 57. In this manner the circuit of FIG. 3 can detect the commencement of asynchronous serial bit transmissions and recover the data transmitted.

With continued reference to FIG. 3, an alternative configuration may be effected by connecting the output of the comparator 40 to the input of the circuit 43 for issuing the discharge pulses when the voltage output of the amplifier 17 exceeds the threshold. In such an embodiment, the utilization device 42 would not be included and the output of the apparatus would be taken from the output of the comparator 40. With this arrangement, the output of the comparator 40 is a pulse train of frequency proportional to the light power impinging upon the phototransistor 15. The circuit functions as an oscillator having a frequency output determined by the light signal strength. Binary information may be detected by applying the output of the comparator 40 to a monostable multivibrator timer (not shown) configured such that in the presence of light, the timer is continually reset by the pulse train output of the comparator 40 before it times out. In the absence of light the timer would time out and generate a signal which would correspond to the data bit.

With continued reference to FIG. 3, a further embodiment of the invention may be configured wherein the comparator 40 would not be utilized and the output of the buffer amplifier 17 would be connected directly as an input to the utilization device 42. The utilization device 42 would be programmed to periodically examine the output of the buffer amplifier 17 and thereafter discharge the capacitor 16. The periodicity of the operation would be chosen so that in the presence of light a signal is present at the output of the amplifier 17 at the sample times and in the absence of light no signal is present thereat. In this manner the data provided by the data source 10 is detected. The presence of light may correspond to binary one or binary zero.

Figure 5:
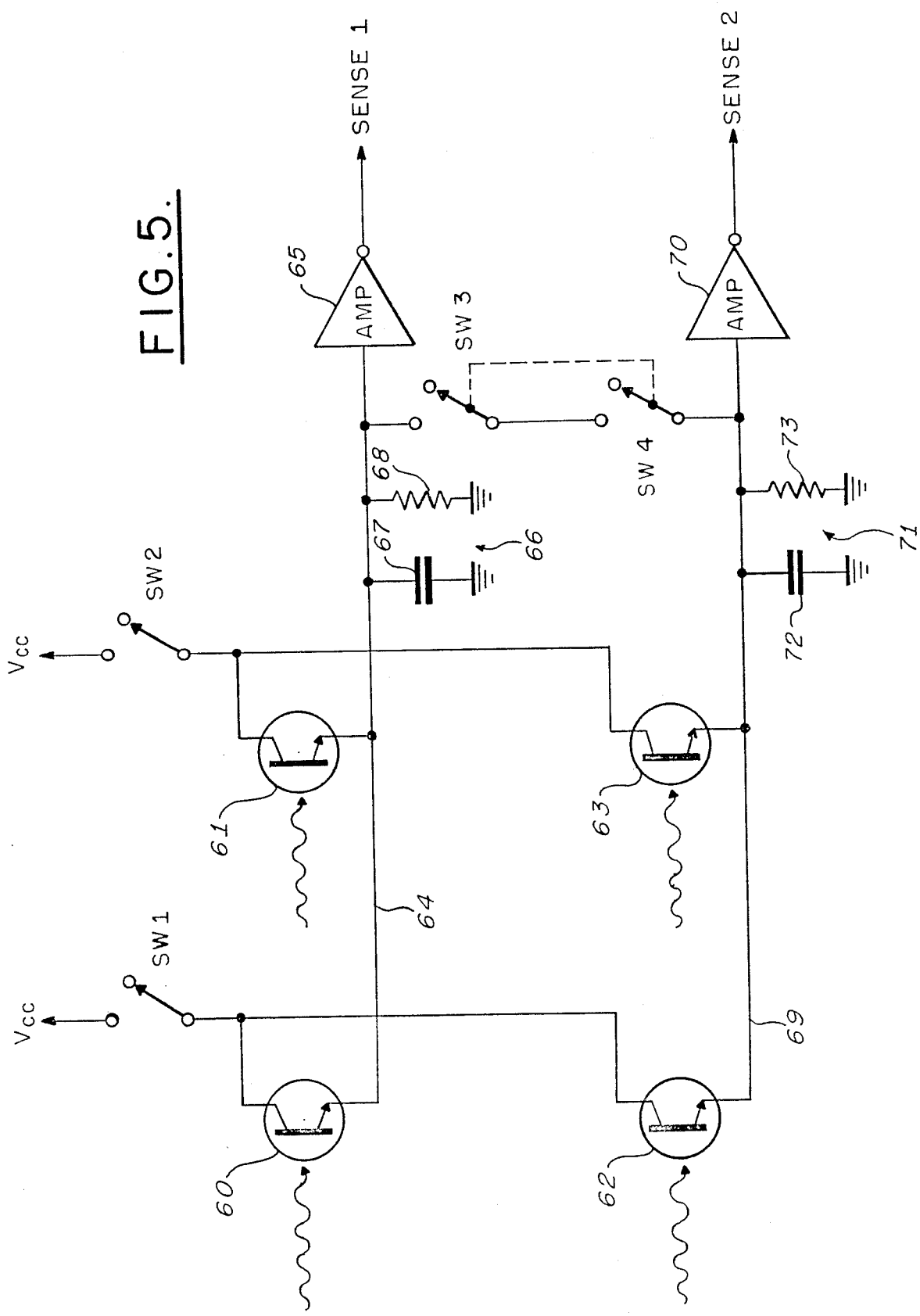
FIG. 5 is a schematic circuit diagram illustrating the use of the invention in a keyboard environment.

Referring now to FIG. 5, an optical keyboard is illustrated utilizing the principles of the invention. The keyboard configuration includes a matrix of phototransistors exemplified by a 2×2 matrix represented by phototransistors 60, 61, 62 and 63. Phototransistors 60 and 61 are in a first row of the keyboard and phototransistors 62 and 63 are in a second row of the keyboard. The phototransistors 60 and 62 are in a first column of the keyboard and the phototransistors 61 and 63 are in a second column thereof. The collectors of the phototransistors 60 and 62 are connected together and to a switch SW1. The collectors of the phototransistors 61 and 63 are connected together and to a switch SW2. The emitters of the phototransistors 60 and 61 are connected together by a line 64 which provides the input to a sense amplifier 65. The line 64 is coupled to ground through an RC network 66 comprised of a capacitor 67 and a resistor 68. The line 64 is also coupled to ground through a switch SW3.

The emitters of the phototransistors 62 and 63 are connected together by a line 69 which provides the input to a sense amplifier 70. The line 69 is coupled to ground through an RC network 71 comprised of a capacitor 72 and a resistor 73. The line 69 is also coupled to ground through a switch SW4. The switch SW4 is ganged with the switch SW3 to simultaneously discharge the RC networks 66 and 71 to ground.

Room light can be admitted to the keyboard through a translucent panel (not shown) at the top of the keyboard. Alternatively LED's may be utilized in the vicinity of each of the phototransistors to provide back-up lighting. A key (not shown) is utilized with each phototransistor to interrupt the light impinging thereon when the key is depressed. With all of the switches open, charge accumulates in each phototransis due to the light impinging thereon. A column is sensed by closing the associated switch (SW1 or SW2) so that the stored charge can flow into the associated RC network generating a voltage that is sensed by the associated sense amplifier.

It is appreciated that each phototransistor stores charge internally as a result of light impinging thereon when the phototransistor does not have a discharge path therefor. Thus, the switches SW1 and SW2 open the discharge paths permitting the internal charge storage to occur. When SW1 or SW2 is closed the charge stored in the phototransistor flows through the emitter thereof into the associated RC network charging the capacitor thereof. The resulting voltage across the associated resistor provides a signal to the sense amplifier to detect key depression.

In operation, column 1 is sampled by closing and opening SW1, detecting the outputs of the sense amplifiers 65 and 70 and thereafter closing and opening switches SW3 and SW4 to discharge the RC networks 66 and 71. Column 2 is then sampled utilizing SW2. The sequential operation of the switches is periodically and continuously performed at a periodicity that is much shorter than the time duration that a key is depressed. When no key is depressed the associated sense amplifier provides an output. When a key is depressed the light impinging on the associated phototransistor is blocked and the associated sense amplifier produces no output signifying the key actuation.

It is appreciated from the foregoing, that the present invention provides an electro-optical device that has a significant degree of noise immunity particularly with respect to high frequency noise. The capacitor 16 has a low impedance to high frequency signals and thus will tend to shunt spurious high frequency signals to ground thereby attenuating such high frequency signals. These properties are particularly advantageous in a fiber optic system since such systems traditionally exhibit lower signal levels than systems implemented by other technologies. The present invention operates over a wide dynamic range of signals and directly provides a TTL digital signal compatible with microprocessor input ports. The invention provides a simple and low cost circuit as well as a fast circuit. Since the capacitor 16 is a low impedance load, the speed of response is only limited by the properties of the phototransistor 15. The threshold of the comparator 40 may be set low resulting in a very small signal requirement to charge the capacitor 16 until the comparator 40 is triggered. Accordingly, the device has good sensitivity and high speed of response.

While the invention has been described in its preferred embodiments, it is to be understood that the words which have been used are words of description rather than limitation and that changes may be made within the purview of the appended claims without departing from the true scope and spirit of the invention in its broader aspects.

I claim:
1. Electro-optical apparatus comprising:
   a source of input data, modulated light means responsive to said input data for providing a modulated light output in accordance with said data,
   a light responsive transistor coupled to receive said modulated light output,
   a capacitor coupled in series circuit with said transistor so that said transistor charges said capacitor in response to said modulated light output impinging thereon,
   whereby a voltage is developed across said capacitor,
   sensing means responsive to said voltage, and
   discharging means coupled across said capacitor for discharging said capacitor,
   thereby providing an electrical output signal in accordance with said data.
2. The apparatus of claim 1 wherein said modulated light means comprises a light emitting diode.
3. The apparatus of claim 1 wherein
   said light responsive transistors has an emitter, and
   said capacitor is coupled to said emitter.
4. The apparatus of claim 1 further including keyboard means comprising a plurality of said light responsive transistors arranged in rows and columns, each said transistor having a collector and an emitter.
5. The apparatus of claim 3 wherein said sensing means comprises a comparator coupled to said emitter for sensing when said voltage across said capacitor exceeds a predetermined threshold.
6. The apparatus of claim 5 wherein said discharging means comprises means coupled to said sensing means for discharging said capacitor in accordance with said voltage.
7. The apparatus of claim 5 wherein said discharging means comprises means coupled to said comparator for discharging said capacitor in accordance with the output of said comparator.
8. The apparatus of claim 5 further including microprocessor means responsive to said comparator for actuating said discharging means at predetermined times.
9. The apparatus of claim 4 further including
   a plurality of first switches, each connected to said collectors of a respective column of said transistors,
   a plurality of second switches, each connected to said emitters of a respective row of said transistors,
   a plurality of sensing means, each coupled to said emitters of a respective row of said transistors, and
   a plurality of capacitors, each coupled to said emitters of a respective row of said transistors.

* * * * *